United States Patent
Yoshida (10) Patent No.: US 6,801,195 B2
(45) Date of Patent: Oct. 5, 2004

(54) DISPLAY DEVICE (75) Inventor: Takamasa Yoshida, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 300 days.

(21) Appl. No.: 10/091,895

(22) Filed: Mar. 6, 2002

(65) Prior Publication Data
US 2002/0126248 A1 Sep. 12, 2002

(30) Foreign Application Priority Data
Mar. 7, 2001 (JP) ........................................ 2001-063255

(51) Int. Cl.⁷ ............................................... G09G 5/00
(52) U.S. Cl. ........................... 345/204; 345/87; 349/56; 349/59

(58) Field of Search .......................... 345/87, 204, 905; 349/56, 58, 59–60

(56) References Cited

U.S. PATENT DOCUMENTS 5,442,470 A * 8/1995 Hashimoto .................... 349/58
5,838,412 A * 11/1998 Ueda et al. .................. 349/150
5,986,726 A * 11/1999 Murai .......................... 349/59

* cited by examiner

Primary Examiner—Jimmy H. Nguyen
(74) Attorney, Agent, or Firm—Michael Best & Friedrich LLP

(57) ABSTRACT

A connecting substrate 23 of a liquid crystal display device 10 is supported by a first support member 41 and a second support member 43 and a first shield plate 31 is separated from a second shield plate 34 by a predetermined distance capable of restricting unnecessary electromagnetic radiation.

6 Claims, 8 Drawing Sheets

DISPLAY DEVICE

BACKGROUND OF THE INVENTION

1. Field of the Invention

The present invention relates to a flat panel type display device of such as a color liquid crystal display device and, in particular, the present invention relates to a flat panel type display device constructed such that unnecessary electromagnetic radiation, which may bring about EMI (Electromagnetic Interference), etc., is restricted.

2. Description of the Prior Art

As a flat panel type display device, a color liquid crystal display device of an active matrix system, for example, includes a liquid crystal display panel and a backlight for illuminating a lower surface of the liquid crystal display panel. A horizontal drive circuit substrate and a vertical drive circuit substrate are arranged outside an outer peripheral portion of the liquid crystal display panel. Further, a signal processing substrate for converting an externally supplied image signal into a horizontal drive signal and supplying the latter signal to a liquid crystal driving IC on the horizontal drive circuit substrate by way of a connecting substrate is arranged on a rear surface side of the liquid crystal display panel. The liquid crystal display panel, the backlight and the horizontal and vertical drive circuit substrates are accommodated in a casing constructed with a front shield plate, which is formed of a metal and has a display window, and a metal rear shield plate for accommodating and holding the backlight.

Figure 1A:
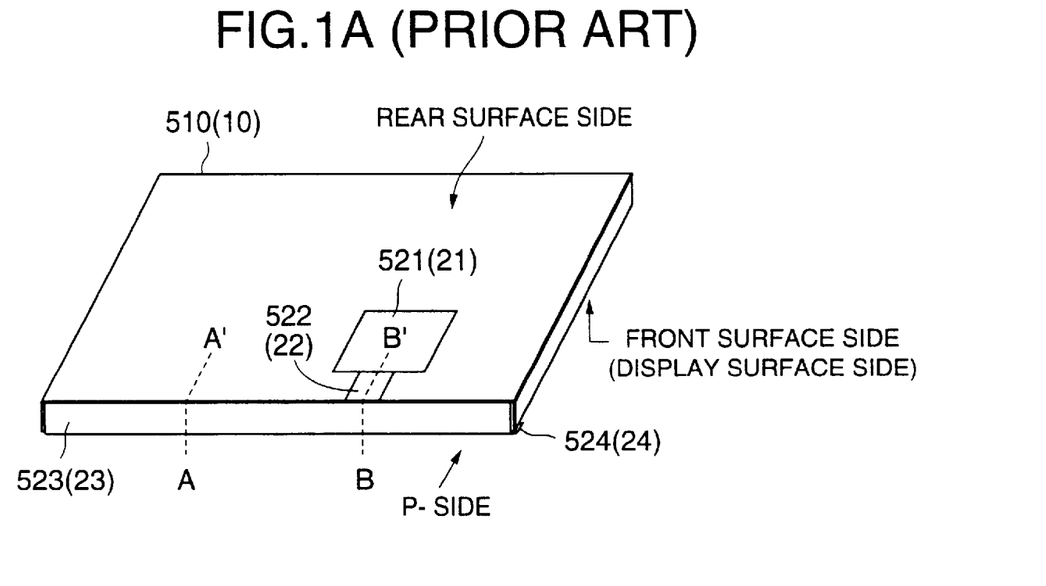
FIG. 1A is a perspective view of an example of a conventional liquid crystal display device, illustrating a positional relation between a liquid crystal display panel, a horizontal driving circuit substrate and a signal processing substrate thereof.
Figure 1B:
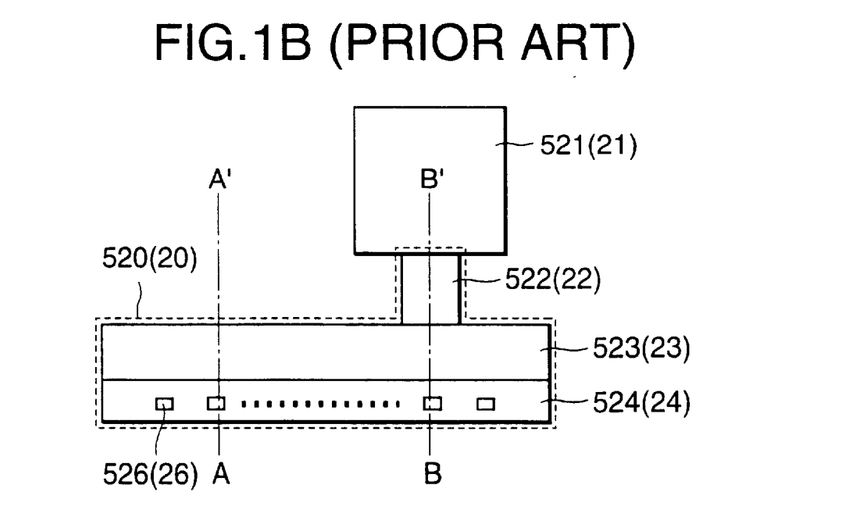
FIG. 1B is a plan view of the signal processing substrate and a connecting unit for connecting the horizontal liquid crystal display panel to the signal processing substrate, which are extended in a pane.
Figure 2A:
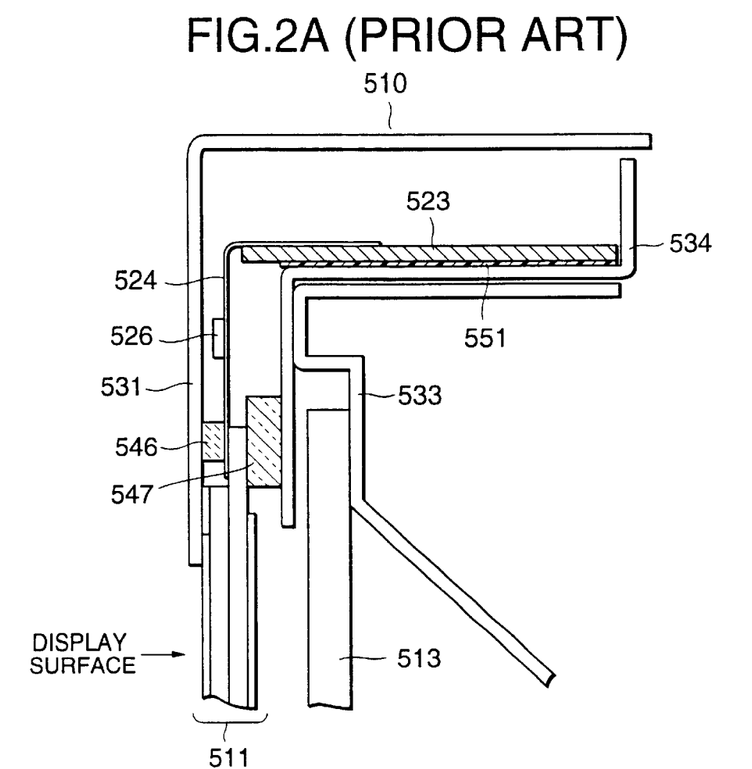
FIG. 2A is a detailed cross sections taken along a line A—A' in FIG. 1A, illustrating a portion having no nail portion for fixing the connecting substrate to a second shield plate.
Figure 2B:
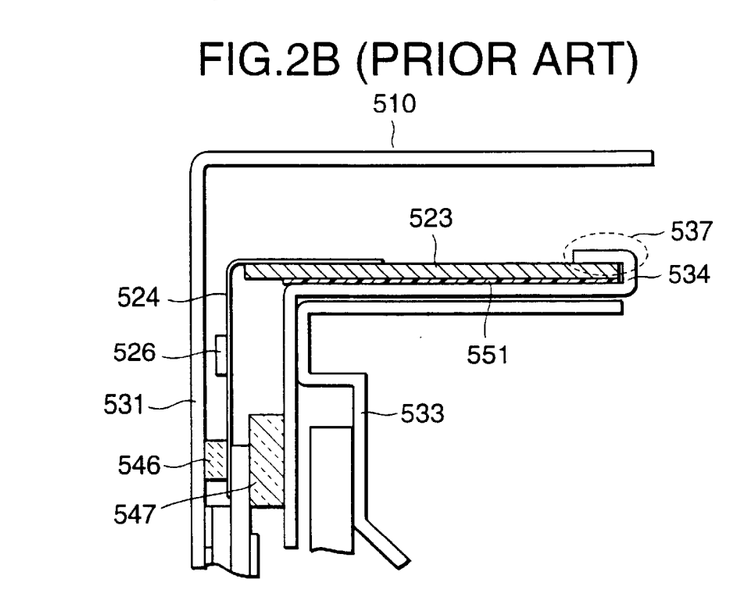
FIG. 2B is a detailed cross sections taken along a line A—A' in FIG. 1A, illustrating a portion having at least one nail portion provided appropriately.
Figure 3:
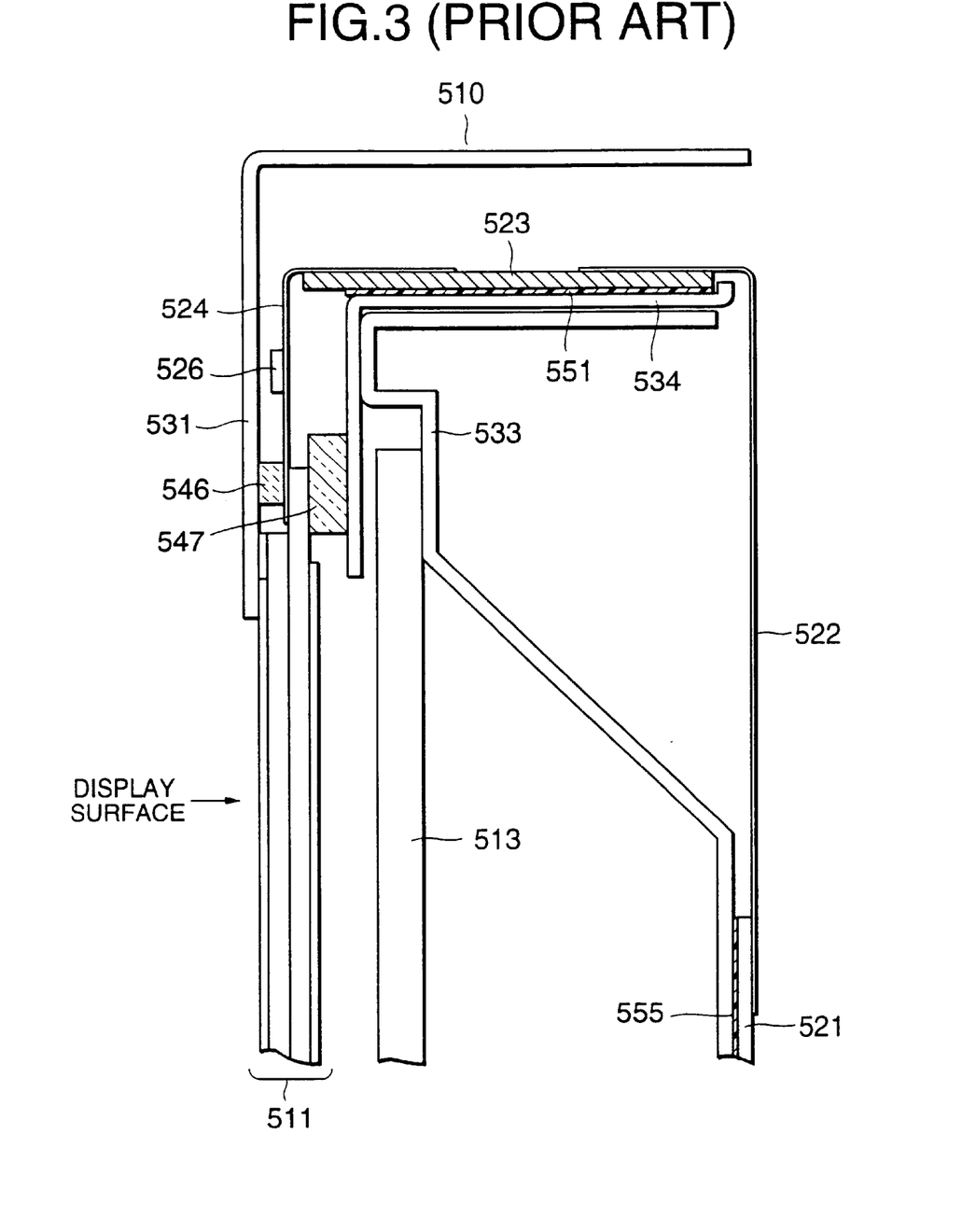
FIG. 3 is a cross section taken along a line B—B' in FIG. 1A.

FIG. 1A is a perspective view of an example of a conventional liquid crystal display device, illustrating a positional relation between a liquid crystal display panel, a horizontal drive circuit substrate and a signal processing substrate thereof and FIG. 1B is a plan view of the signal processing substrate and a connecting unit for connecting the horizontal liquid crystal display panel to the signal processing substrate, which are extended in a plane. Further, FIG. 2A and FIG. 2B are cross sections taken along a line A—A' in FIG. 1A, illustrating a portion of a second shield plate, which has no nail portion for fixing the connecting substrate to the second shield plate and a portion thereof, which has a nail portion provided appropriately, respectively. Incidentally, in order to simplify the illustration, the vertical drive circuit substrate, the front shield plate, the rear shield plate and the backlight, etc, are not shown in FIG. 1A. FIG. 3 is a cross section taken along a line B—B' in FIG. 1A.

Referring to FIG. 1A to FIG. 3, the conventional liquid crystal display device 510 is constructed with the liquid crystal display panel 511, a front shield plate 531, a first rear shield plate 533, a second rear shield plate 534, the signal processing substrate 521, the horizontal drive circuit substrate 524 in the form of a TCP (Tape Carrier Package) on which horizontal driving IC's 526 are mounted, the connecting substrate 523, a flexible printed circuit substrate (referred to as FPC, hereinafter) 522 and a light diffusing plate 513 for uniformly dispersing light from the backlight (not shown), etc. Incidentally, the horizontal drive circuit substrate 524 will be referred to as TCP, hereinafter.

A peripheral portion of the display panel 511, which is a non-display region, is sandwiched between the front shield plate 531 and the second rear shield plate 534 by way of a first spacer 546 and a second spacer plate 547, respectively. The light diffusing plate 513 received and held by the first rear shield plate 533 and the backlight (not shown) are provided on the side of a rear surface (opposite to a display surface) of the liquid crystal display panel 511.

As shown in FIG. 3, the signal processing substrate 521 is fixed to a rear surface side of the first rear shield plate 533 via an insulating sheet 555 and the connecting substrate 523 is fixed to the second rear shield plate 534 in a plane substantially perpendicular to the display surface of the liquid crystal display panel 511 via the insulating sheet 551. This fixation of the connecting substrate 523 is performed by at least one nail portion 537 provided in an appropriate portion of the second rear shield plate 534, as shown in FIG. 2B. The portion of the second rear shield plate 534 in which the nail portion 537 is provided corresponds to a region of the connecting substrate 523 in which any wiring pattern is not formed. Incidentally, a connecting unit 520 for connecting the signal processing substrate 521 to the liquid crystal display panel 511 includes the FPC 522, the connecting substrate 523 and the TCP 524, as shown in FIG. 1B.

One end of the TCP 524 (on the output end side) is bonded to electrodes provided in an edge portion of the liquid crystal display panel 511 by thermocompression bonding with using, for example, a thermoplastic, anisotropic electrically conductive film and the other end (input end side) thereof is connected to the connecting substrate 523 by, for example, soldering. The connecting substrate 523 and the signal processing substrate 521 are connected to each other by the FPC 522.

Incidentally, an outer casing (not shown) having at least an electrically conductive inner surface portion and covering the whole rear surface of the liquid crystal display panel including the signal processing substrate 521 is provided on the rear surface side of the liquid crystal display device 510. The front shield plate, the first rear shield plate and the second rear shield plate are connected to the inner surface portion of the outer casing.

In the conventional liquid crystal display device 510 described above, an electromagnetic shield structure for restricting EMI, etc., due to unnecessary electromagnetic radiation from electronic parts and wiring mounted on the signal processing substrate 521, the TCP 524 and/or the vertical driving circuit substrate, which is not shown, etc., is formed by connecting at least the electrically conductive inner surface portion of the outer casing covering these components to a common ground terminal (not shown) of the liquid crystal display device 510.

However, with the recent tendency of increase of the operating frequency, particularly, the horizontal driving frequency, of the liquid crystal display device, unnecessary electromagnetic radiation becomes a problem in, particularly, the connecting substrate 523 in which a number of horizontal drive signals are transmitted along a long wiring within a limited region. As shown in FIG. 2A, FIG. 2B and FIG. 3, the connecting substrate 523 is fixed to the second rear shield pate 534 via the thin insulating sheet 551 and, therefore, the electric insulation is maintained. However, it has been found that, when a number of high frequency signals flow in the connecting substrate 523, the signals are leaked between the first rear shield plate 533 and the second rear shield plate 534 by such as capacitive coupling and unnecessary electromagnetic radiation occurs through the first rear shield plate 533 and the second rear shield plate 534 as an antenna.

SUMMARY OF THE INVENTION

An object of the present invention is to provide a display device such as a color liquid crystal display device having a structure with which unnecessary electromagnetic radiation, which may cause EMI, etc., can be restricted even when a number of high frequency signals are transmitted through a long wiring in a connecting substrate having limited wiring space.

In order to achieve the above object, the display device according to the present invention is featured by comprising at least a display unit for displaying an image on a front surface of the display unit, a signal processing unit for processing an externally supplied image signal and outputting a first signal for displaying the image, a drive unit for receiving the first signal and outputting a second signal for driving the display unit, a connecting unit for connecting the signal processing unit to the display unit, a first shield unit formed of an electrically conductive material such as metal and having an opening portion corresponding to an image displaying region of the display unit, for electromagnetically shielding a peripheral region and a side face region of the image display surface and a second shield unit formed of an electrically conductive material such as metal, etc., for electromagnetically shielding a whole rear side surface of the display unit. The connecting unit comprises a first flexible connecting portion connected to the signal processing unit, a second flexible connecting portion connected to the display unit and mounting the drive unit thereon and a connecting substrate for connecting the first flexible connecting portion and the second flexible connecting portion to each other, the connecting substrate being kept in a position between the first shield unit and the second shield unit separated from the first and second shield units by predetermined distances, respectively.

It is referable that, representing the distance between the first shield unit and the second shield unit arranged on the connecting substrate by L and distances between a center of the connecting substrate in thickness direction and the first shield unit and the second shield unit by d1 and d2, respectively, d1 and d2 satisfy the following relations to L:

$$d1 \geq 0.4 \times L \text{ and } d2 \geq 0.4 \times L.$$

The display device may further comprise a first support member for supporting a portion between the connecting substrate and the first shield unit and a second support member for supporting a portion between the connecting substrate and the second shield unit. Heights of the first and second support members are equal to each other. The first support member and the second support member are preferably formed of electrically non-conductive material such as silicon rubber.

The display unit may be a liquid crystal display panel composed of two substrates opposing to each other with a predetermined gap therebetween and liquid crystal material layer arranged between the two substrates.

DETAILED DESCRIPTION OF THE PREFERRED EMBODIMENTS

The present invention will be described with reference to the drawings.

Figure 4:
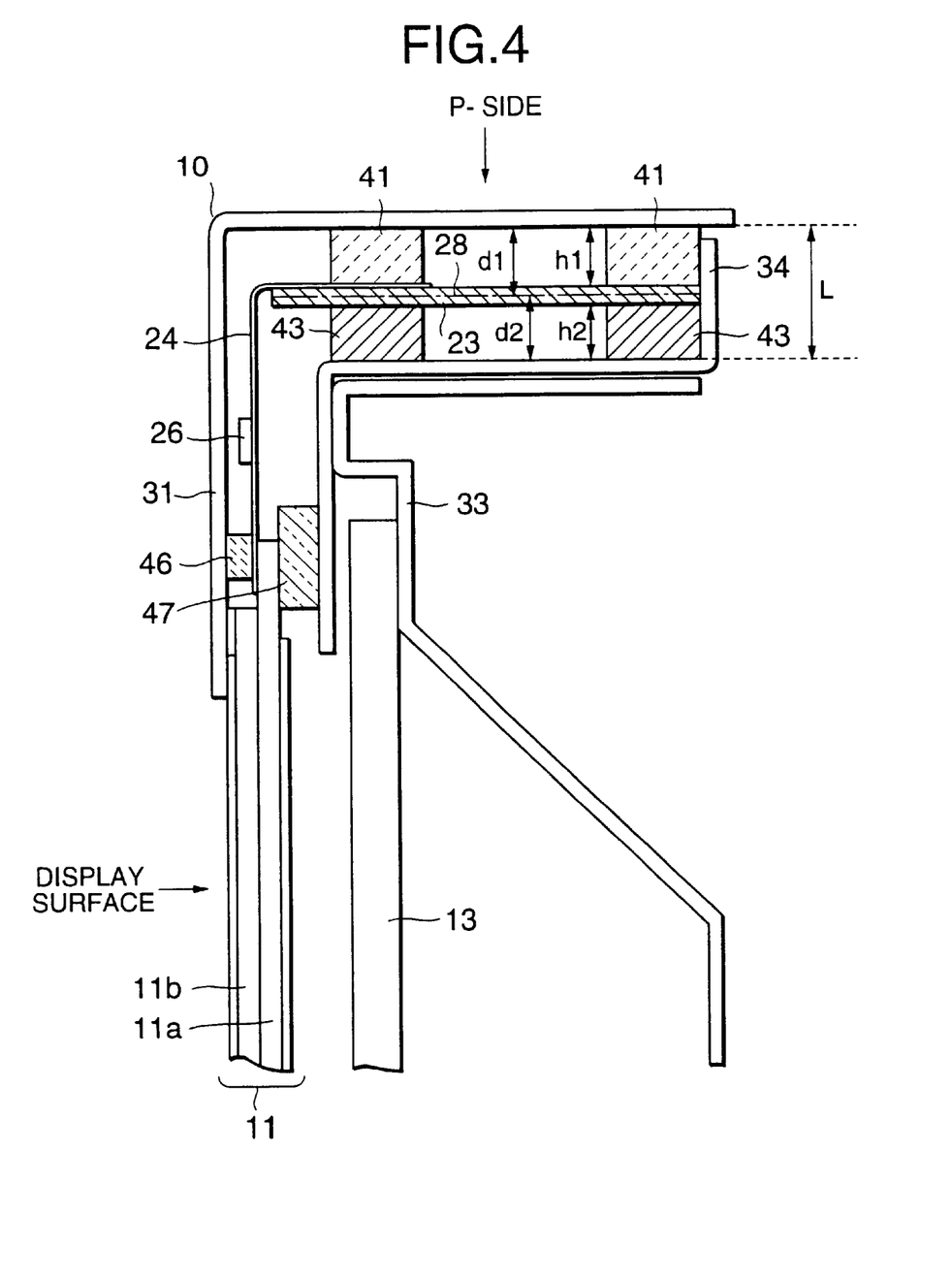
FIG. 4 is a cross section, illustrating a main portion of a liquid crystal display device according to an embodiment of the present invention.
Figure 5:
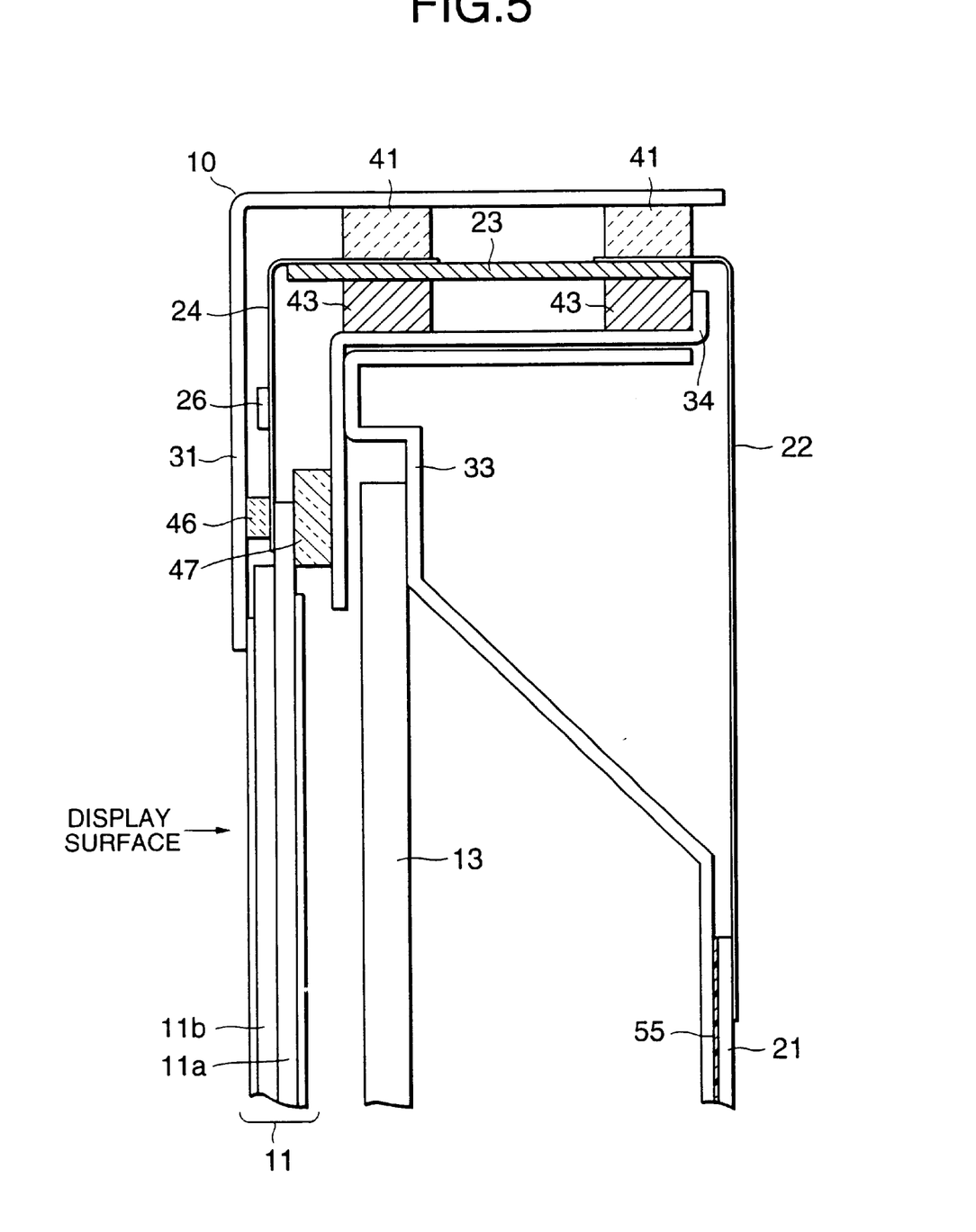
FIG. 5 is a cross section, illustrating a main portion of a liquid crystal display device according to an embodiment of the present invention.

FIG. 4 and FIG. 5 are cross sections showing main portions of a liquid crystal display device according to an embodiment of the present invention, respectively. Incidentally, a positional relation between a liquid crystal display panel, a horizontal driving circuit substrate and a signal processing substrate in the liquid crystal display device of this embodiment is similar to that in the conventional liquid crystal display device shown in FIG. 1 and FIG. 4 and FIG. 5 are cross sections taken along the lines A—A' and B—B' in FIG. 1A, respectively.

Referring to FIG. 4 and FIG. 5 together with FIG. 1, the liquid crystal display device 10 of the embodiment is constructed with at least a liquid crystal display panel 11 as a display unit for displaying an image on a front surface side, a signal processing substrate 21 as a signal processing unit for processing an externally supplied image signal and outputting a first signal for displaying the image, driving IC's 26 as a driving unit responsive to the first signal from the signal processing substrate 21 for outputting a second signal for driving the liquid crystal display panel 11, a front shield plate 31 as a first metal shield unit having an opening portion in an image display region of the liquid crystal display panel 11, for electromagnetically shielding a peripheral region and a side face region of an image display surface side of the liquid crystal display panel 11, a first rear shield plate 33 and a second rear shield plate 34 as a metal second shield unit for covering the whole rear surface side of the liquid crystal display panel 11, an FPC 22 as a first flexible connecting portion for connecting the signal processing substrate 22, a TCP 24 as a connecting substrate for connecting the FPC 22 and the TCP 24, a first support member 41 and a second support member 43 for supporting portions between the connecting substrate 23 and the front shield plate 31 and between the connecting porting substrate 23 and the second rear shield plate 34, respectively, a backlight, which is not shown, and a light diffusing plate 13 for uniformly dispersing light from the backlight. Incidentally, the first rear shield plate 33 and the second rear shield plate 34 are mutually connected by, for example, screws (not shown). Further, the connecting unit 20 for connecting the liquid crystal display panel 11 and the signal processing plate 21 includes the FPC 22, the connecting substrate 23 and the TCP 24.

Similarly to the conventional liquid crystal display device, the peripheral portion of the liquid crystal display panel 11 of the liquid crystal display device 10 of the present invention is sandwiched between the front shield plate 31 and the second rear shield plate 34 with a first spacer 46 and a second spacer 47 inside them, respectively. A light diffusing plate 13 received and held by the first rear shield plate 33 and a backlight, which is not shown, are provided on the side of a rear surface (opposite to a display surface) of the liquid crystal display panel 11. The signal processing substrate 21 is fixed to a rear surface side of the first rear shield plate 33 through, for example, an insulating sheet 55 and the connecting substrate 23 is supported between the front shield plate 31 and the second rear shield plate 34 through the first support members 41 and the second support members 43 and fixed therein in a plane substantially perpendicular to the display surface of the liquid crystal display panel 11. The first support members 41 and the second support members 43 may be formed of an electrically non-conductive material such as, for example, silicon rubber. The position of the connecting substrate 23 in vertical direction is defined in such a way that, representing the distance between the opposing surfaces of the front shield plate 31 and the second rear shield plate 34 by L and distances between a center line 28 of the connecting substrate 23 in a thickness direction thereof and the surfaces of the front shield plate 31 and the second rear shield plate 33, which oppose to the connecting substrate 23, by d1 and d2, respectively, d1 and d2 satisfy the following relations to L:

$$d1 \geq 0.4 \times L \text{ and } d2 \geq 0.4 \times L$$

In a usual case, d1 and d2 may be equal, for example. Alternatively, representing heights of the first support member 41 and the second support member 43, that is, distances between the connecting substrate 23 and the front shield plate 31 and between the connecting substrate 23 and the second shield substrate 34, by h1 and h2, respectively, h1 and h2 may be defined by h1=h2.

The liquid crystal display panel 11 includes a glass substrate 11a on which a plurality of transistors, for example, are formed in matrix, an opposing substrate 11b having an opposing electrode and a liquid crystal material layer (not shown) sandwiched between these substrates arranged in parallel with a predetermined gap therebetween. One end (output side) of the TCP 24 is bonded to the electrodes provided on side face portion of the glass substrate 11a of the liquid crystal display panel 11 by thermocompression bonding with using, for example, electrically conductive anisotropic film of thermoplastic material and the other end (input end side) thereof is bonded to the connecting substrate 23 by thermocompression bonding. The connecting substrate 23 and the signal processing substrate 521 are connected to each other by the FPC 22.

The liquid crystal display device 10 of this embodiment includes an outer casing (not shown), which is provided on the side of the rear surface. The outer casing has at least inner side thereof, which is electrically conductive, and covers the whole portion of the device including the signal processing substrate 21. The outer casing is fixed to the first rear shield plate 33 and the second rear shield 34 by, for example, screws. Incidentally, it may be possible on demand to electrically connect the outer casing, the first rear shield plate 33 and the second rear shield plate 34 together by such as metal leaf springs (fingers) to reinforce the electric connection thereof. Further, since the connecting substrate 23 is separated from the front shield plate 31 as well as the second rear shield plate 34, a capacitive coupling between the wiring on the connecting substrate 23 and the first shield plate 31 and the second rear shield plate 34 becomes small enough. Therefore, leakage of high frequency signal to the front shield plate 31 and the second rear shield plate 34 becomes sufficiently small even when a number of high frequency signals are transmitted through a long wiring on the connecting substrate 23 having limited wiring space. Thus, unnecessary electromagnetic radiation caused by the front shield plate 31 and the second rear shield plate 34, which function an antenna can be restricted.

Although configurations of the first support member 41 and the second support member 43 are not described in detail, the configurations thereof are not specifically limited provided that the distance between the front shield plate 31 and the second rear shield plate 34 can be maintained without warping the connecting substrate 23. FIG. 6A to FIG. 6J show various examples of configurations of the support members. In FIG. 6A, FIG. 6B, FIG. 6F and FIG. 6G are plan views showing four examples of a pattern of the configuration of the support member when the connecting substrate 23 is looked from a P portion side in FIG. 4 or FIG. 1 (in order to facilitate the understanding, the front shield plate 31 is removed). FIG. 6C, FIG. 6D, FIG. 6E, FIG. 6H, FIG. 6I and FIG. 6J are cross sections thereof illustrating the supporting state of the first support member 41 and the second support member 43 supporting the connecting substrate 23.

Figure 6A:
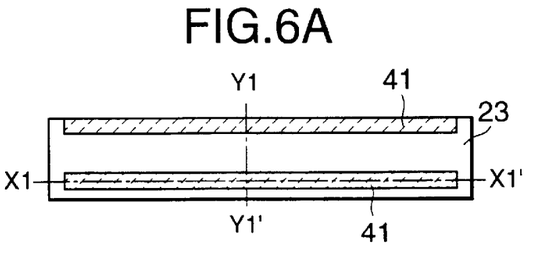
FIG. 6A is a plan view showing a first example of a support member employed by the present invention.
Figure 6B:
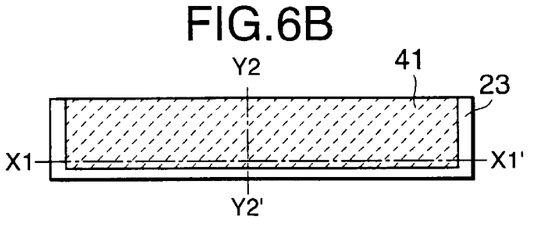
FIG. 6B is a plan view showing a second example of the support member employed by the present invention.
Figure 6C:
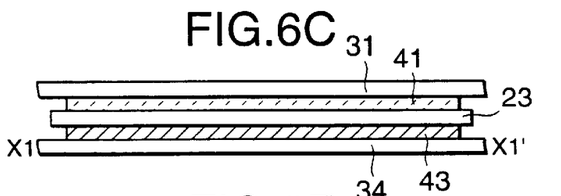
FIG. 6C is a cross section taken along a line X1—X1' in FIG. 6B.
Figure 6D:
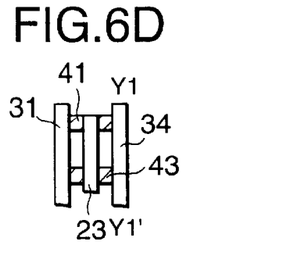
FIG. 6D is a cross section taken along a line Y1—Y1' in FIG. 6A.
Figure 6E:
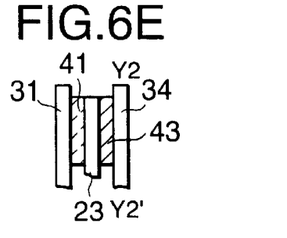
FIG. 6E is a cross section taken along a line Y2—Y2' in FIG. 6B.
Figure 6F:
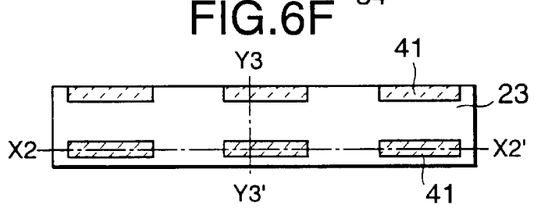
FIG. 6F is a plan view showing a third example of the support member employed by the present invention.
Figure 6G:
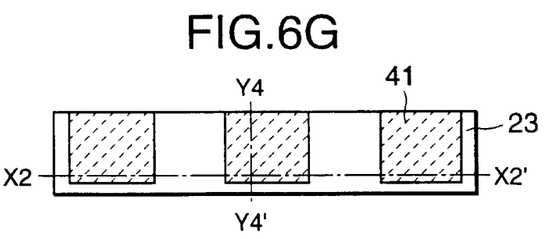
FIG. 6G is a plan view showing a fourth example of the support member employed by the present invention.
Figure 6H:
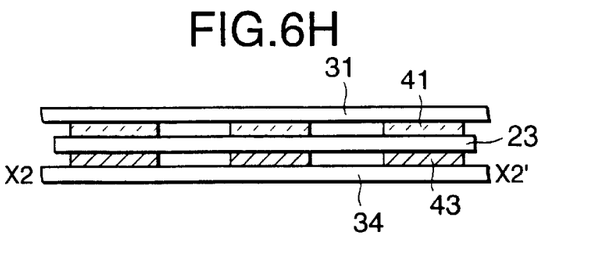
FIG. 6H is a cross section taken along a line X2—X2' in FIG. 6F and FIG. 6G.
Figure 6I:
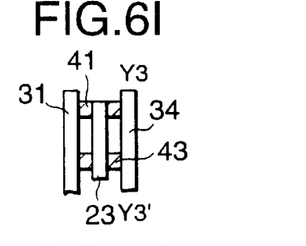
FIG. 6I is a cross section taken along a line Y3—Y3' in FIG. 6F.
Figure 6J:
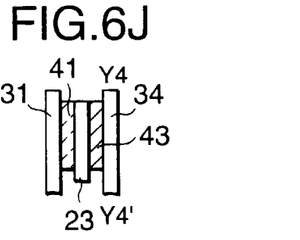
FIG. 6J is a cross section taken along a line Y4—Y4' in FIG. 6G.

In the example shown in FIG. 6A, each of the first support member 41 and the second support member 43 is constructed with two support pieces for supporting substantially a whole length of a longer side of the connecting substrate 23 and, in the example shown in FIG. 6B, constructed with a single support piece for supporting a whole area of the connecting substrate 23. In the examples shown in FIG. 6F and FIG. 6G, the two support pieces shown in FIG. 6A and the single support piece shown in FIG. 6B are divided to a plurality of supporting pieces in the longer side direction of the connecting substrate 23 to thin them with opposite end portions thereof in the longer side direction being left as they are.

Figure 7:
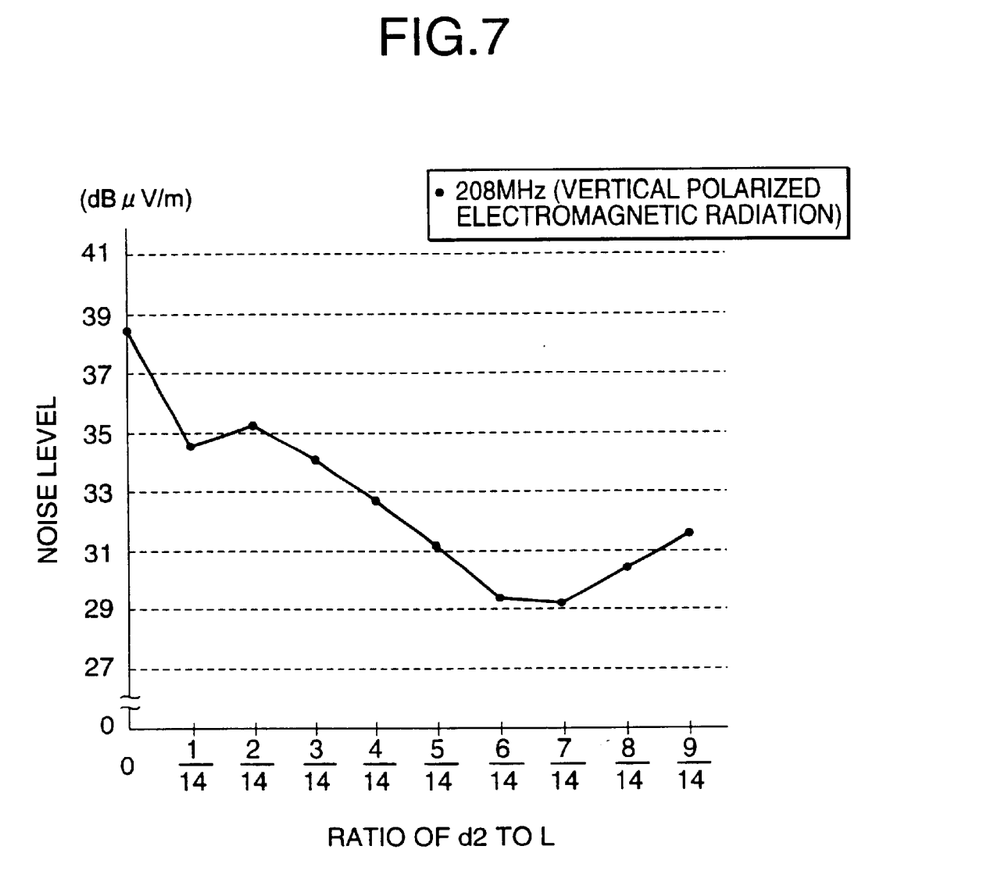
FIG. 7 is a graph showing an example of a result of measurement of unnecessary electromagnetic radiation from the liquid crystal display device according to the embodiment of the present invention.
Figure 8:
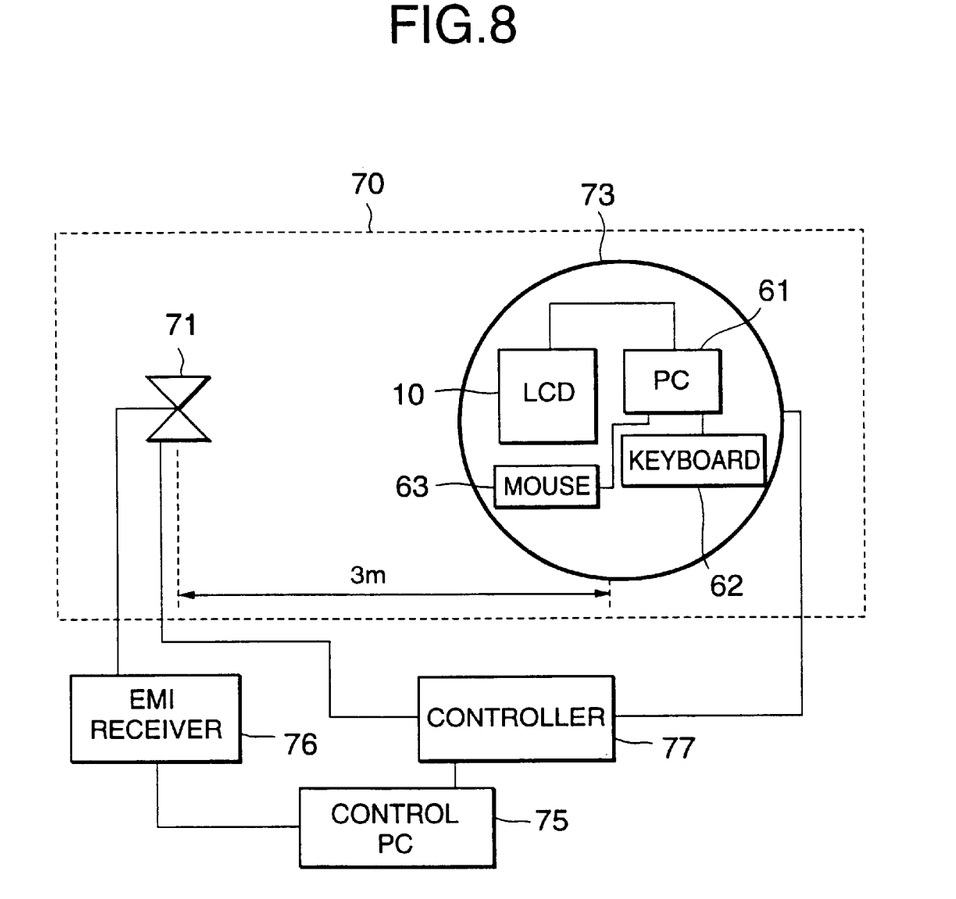
FIG. 8 is a block diagram of an electromagnetic radiation measuring system with which unnecessary electromagnetic radiation of the display device is measured.

The restricting effect of unnecessary electromagnetic radiation in the liquid crystal display device according to this embodiment will be described with reference to FIG. 7 and FIG. 8 in which FIG. 7 is a graph showing a result of measurement of unnecessary electromagnetic radiation from the liquid crystal display device of this embodiment and FIG. 8 is a block diagram of a measuring system for measuring unnecessary electromagnetic radiation.

A construction of the measuring system shown in FIG. 8 will be described first. Together with a personal computer (referred to as PC, hereinafter) 61, a keyboard 62 and a mouse 63, etc., the liquid crystal display device 10 such as shown in FIG. 4, which has the outer casing, is mounted on a turntable 73 within a predetermined shield room 70. An antenna 71 for measuring an amount of electromagnetic radiation from the liquid crystal display device 10 is arranged in the shield room 70 at a position remote from the measuring object, that is, the liquid crystal display device 10, on the turntable by 3 m. Usually, the measuring object is positioned in a center of the turntable 73. The antenna 71 is connected to an EMI receiver 76 arranged outside the shield room 70. Positions of the antenna 71 and the turntable 73 are controlled by a controller 77 arranged outside the shield room 70 such that a distance between the liquid crystal display device 10 as the measuring object and the antenna 71 becomes 3 m. Further, the EMI receiver 76 and the controller 77 are connected to a control PC 75 arranged outside the shield room 70, for controlling the whole measuring system.

The measurement is performed by using this measuring system. That is, a power source of the liquid crystal display device 10 is turned off and a power source for the PC 61, the keyboard 62 and the mouse 63 is turned on to make the system in a usual operating state. In this state, an amount of electromagnetic radiation is measured. And then, a power source of the liquid crystal display device 10 is turned on and an amount of electromagnetic radiation is measured. A difference in amount of electromagnetic radiation between the first measurement and the second measurement is the amount of electromagnetic radiation from the liquid crystal display device 10. This measurement is performed for a predetermined frequency range. Further, it is possible to measure an amount of electromagnetic radiation in a periphery of the liquid crystal display device 10 by performing the measurement while changing height of the antenna 71 within a predetermined range (for example, in a range from 1 m to 2 m) and successively changing an angle of the liquid crystal display device 10 with respect to the antenna 71 by rotating the turntable 73. FIG. 7 is a graph showing a result of the measurement performed by changing a distance d2 between the connecting substrate 23 and the second rear shield plate 34 of the liquid crystal display device 10 and changing a frequency in a range from 30 MHz to 1000 MHz for every value of d2. Ordinate indicates the amount of electromagnetic radiation (noise level) of the liquid crystal display device 10 by peak values of electromagnetic radiation and abscissa indicates the distance d2 between the second rear shield plate 34 and the centerline 28 of the connecting substrate 23. Incidentally, in this graph, d2 is shown as a ratio to the distance L between the front shield plate 31 and the second rear shield plate 34. In this example, the peak noise level is obtained at frequency of 208 MHz (vertical polarized electromagnetic radiation). Referring to FIG. 7, the noise level, that is, the peak value of unnecessary electromagnetic radiation in the frequency range from 30 MHz to 1000 MHz, becomes minimum in the distance range d2=(3/7)L to L/2.

Although the embodiment has been described by using the liquid crystal display device as an example, the present invention is not limited thereto. It is possible to obtain similar effect to that described above in a display device such as a flat type display device such as, for example, an EL display device, etc., which has a construction in which high frequency signal is transmitted through a long transmission line on a connecting substrate having a limited wiring space.

As described hereinbefore, the display device according to the present invention has a merit that it is possible to restrict EMI, etc., of a display device since it is possible to restrict unnecessary electromagnetic radiation from the connecting substrate even when high frequency signal is transmitted through a long transmission line on a connecting substrate having a limited wiring space.

What is claimed is:

1. A display device comprising:
   a display unit for displaying an image on a front surface thereof;
   a signal processing unit for outputting a first signal for image display by processing an externally supplied image signal:
   a drive unit responsive the first signal from said signal processing unit or outputting a second signal for driving said display unit;
   a connecting unit for connecting said signal processing unit and said display unit, said connecting unit comprising a first flexible connecting portion connected to said signal processing unit, a second flexible connecting portion connected to said display unit and mounting said drive unit thereon and a connecting substrate portion for connecting said first flexible connecting portion and said second flexible connecting portion;
   an electrically conductive first shield unit having an opening portion in an image display region of said display unit and electromagnetically shielding a peripheral region and a side surface region of said image display region;
   an electrically conductive second shield unit for electromagneticall shielding a whole rear surface side of said display unit and supporting said connecting substrate portion in a position between said first shield unit and said second shield unit, with said connecting substrate portion remote from said second shield unit and remote from said first shield unit by predetermined distances, respectively; and
   wherein, representing the distance between said first shield unit and said second shield unit by L and distances between a center of said connecting substrate portion in a thickness direction thereof and said first shield unit and said second shield unit by d1 and d2, respectively, d1 and d2 satisfy the following relations to L:

$$d1 \geq 0.4 \times L \text{ and } d2 \geq 0.4 \times L.$$

2. A display device as claimed in claim 1, wherein said display unit is a liquid crystal display panel including two substrates arranged in parallel with a predetermined gap and liquid crystal material layer sandwiched between said two substrates.

3. A display device comprising:
   a display unit for displaying an image on a front surface thereof;
   a signal processing unit for outputting a first signal for image display by processing an externally supplied image signal;
   a drive unit responsive the first signal from said signal processing unit or outputting a second signal for driving said display unit;
   a connecting unit for connecting said signal processing unit and said play unit, said connecting unit comprising a first flexible connecting portion connected to said signal processing unit, a second flexible connecting portion connected to said display unit and mounting said drive unit thereon and a connecting substrate portion for connecting said first flexible connecting portion and said second flexible connecting portion;

an electrically conductive first shield unit having an opening portion in an image display region of said display unit and electromagnetically shielding a peripheral region and a side surface region of said image display region;

an electrically conductive second shield unit for electromagneticall shielding a whole rear surface side of said display unit and supporting said connecting substrate portion in a position between said first shield unit and said second shield unit, with said connecting substrate portion remote from said first shield unit and said second shield unit by predetermined distances, respectively; and a first support member for supporting an area between said connecting substrate portion and said first shield unit and a second support member for supporting an area between said connecting substrate portion and said second shield unit, wherein heights of said first and second support members corresponding to respective distances between said connecting substrate portion and said first and second shield units are equal to each other.

4. A display device as claimed in claim 3, wherein said first support member and said second support member are formed of electrically non-conductive material.

5. A display device as claimed in claim 4, wherein said electrically non-conductive material is silicon rubber.

6. A display device as claimed in claim 3, wherein said display unit is a liquid crystal display panel including two substrates arranged in parallel with a predetermined gap and liquid crystal material layer sandwiched between said two substrates.

* * * * *